United States Patent [19]

Takanabe et al.

[11] Patent Number: 5,359,527
[45] Date of Patent: Oct. 25, 1994

[54] NAVIGATION SYSTEM FOR VEHICLE

[75] Inventors: Naoko Takanabe; Hiroaki Ideno; Shuichi Nishikawa, all of Hyogo, Japan

[73] Assignee: Mitsubishi Denki Kabushiki Kaisha, Tokyo, Japan

[21] Appl. No.: 963,391

[22] Filed: Oct. 19, 1992

[30] Foreign Application Priority Data

Nov. 6, 1991 [JP] Japan .................................. 3-289843

[51] Int. Cl.⁵ ............................................. G06F 15/50
[52] U.S. Cl. ................................... 364/449; 364/444; 340/990; 340/995
[58] Field of Search ....................... 364/443, 444, 449; 73/178 R; 340/988, 990, 995

[56] References Cited

U.S. PATENT DOCUMENTS

| | | | |
|---|---|---|---|
| 4,782,447 | 11/1988 | Ueno et al. | 340/995 |
| 4,796,189 | 1/1989 | Nakayama et al. | 364/444 |
| 4,926,336 | 5/1990 | Yamada | 364/444 |
| 4,954,959 | 9/1990 | Moroto et al. | 364/449 |
| 4,984,168 | 1/1991 | Neukrichner et al. | 340/995 |
| 5,041,983 | 8/1991 | Nakahara et al. | 340/990 |
| 5,072,395 | 12/1991 | Bliss et al. | 364/444 |
| 5,103,400 | 4/1992 | Yamada et al. | 340/995 |
| 5,107,433 | 4/1992 | Helldörfer et al. | 364/444 |
| 5,115,399 | 5/1992 | Nimura et al. | 364/444 |
| 5,191,532 | 3/1993 | Moroto et al. | 364/444 |

*Primary Examiner*—Gary Chin
*Attorney, Agent, or Firm*—Burns, Doane, Swecker & Mathis

[57] ABSTRACT

A vehicle navigation system providing an operator with a route from a present position of a vehicle to a concrete destination by displaying the route on a display. A destination decision processing section extracts a plurality of candidates of the concrete destination from a map data memory according to a general destination input by an operator, and displays the candidates on the display. A route search processing section searches a route from the present position to one of the candidates which has been selected by the operator, and displays the searched route on the display.

5 Claims, 16 Drawing Sheets

FIG. 3

| MAIN ROAD | EXPRESSWAY | STATION |
| --- | --- | --- |
| HOSPITAL | DEALER | GAS STATION |
| RESTAURANT | PARKING LOT | CONVENIENCE STORE |
| DEPARTMENT STORE | SUPERMARKET | COFFEE SHOP |

FIG. 6

STATION-AREA NUMBER 1500

| NAME | ATTRIBUTE (LINE NAME) | EAST LONGITUDE (DEG, MIN, SEC.) | NORTH LATITUDE (DEG, MIN, SEC.) |
| --- | --- | --- | --- |
| INADERA | JR | 136, 02, 43 | 33, 03, 30 |
| TSUKAGUCHI | JR | 136, 02, 00 | 33, 02, 30 |
| TSUKAGUCHI | HANKYU | 136, 02, 00 | 33, 03, 00 |
| MUKONOSO | HANKYU | 136, 01, 00 | 33, 03, 00 |

FIG. 4A

| DESTI-NATION | CLASS | EAST LONGITUDE (DEG. MIN. SEC.) | NORTH LATITUDE (DEG. MIN. SEC.) | ATTRIBUTE | | | AREA NUMBER |
|---|---|---|---|---|---|---|---|
| STATION | 1 | | | NEAR | JR | | |
| | | | | | | | |
| | | | | | | | |
| | | 136,00,00 -136,03,00 | 33,00,00 -33,02,00 | NEAR | JR HANKYU | HANSHIN | 1499 |
| | | 136,00,00 -136,03,00 | 33,02,00 -33,04,00 | NEAR | JR HANKYU | | 1500 |

FIG. 4B

| DESTI-NATION | CLASS | EAST LONGITUDE (DEG. MIN. SEC.) | NORTH LATITUDE (DEG. MIN. SEC.) | ATTRIBUTE | | | AREA NUMBER |
|---|---|---|---|---|---|---|---|
| MAIN ROAD | 2 | | | | | | |
| | | | | | | | |
| | | | | | | | |
| | | 135, 00, 00 ~135, 01, 30 | 34, 00, 00 ~34, 01, 00 | NEAR | ROUTE 1 | | 5297 |
| | | 135, 00, 00 ~135, 01, 30 | 34, 01, 00 ~34, 02, 00 | NEAR | ROUTE 1 | | 5298 |
| | | 135, 01, 30 ~135, 03, 00 | 34, 01, 00 ~34, 02, 00 | NEAR | ROUTE 1 | ROUTE 2 | 5299 |
| | | 135, 01, 30 ~135, 03, 00 | 34, 02, 00 ~34, 03, 00 | NEAR | ROUTE 1 | ROUTE 2 | ROUTE 3 | 5300 |

FIG. 5

| DESTI-NATION | CLASS | EAST LONGITUDE (DEG. MIN. SEC.) | NORTH LATITUDE (DEG. MIN. SEC.) | ATTRIBUTE | | | AREA NUMBER |
|---|---|---|---|---|---|---|---|
| EXPRESS-WAY | 3 | | | | | | |
| | | | | | | | |
| | | | | | | | |
| | | 136, 00, 00 ~136, 06, 00 | 34, 00, 00 ~34, 04, 00 | NEAR | FIRST EXPRESS-WAY | SECOND EXPRESS-WAY | 349 |
| | | 136, 00, 00 ~136, 06, 00 | 34, 04, 00 ~34, 08, 00 | NEAR | FIRST EXPRESS-WAY | SECOND EXPRESS-WAY | 350 |

MAIN ROAD
AREA NUMBER 5299

| INTERSECTION NUMBER | ATTRIBUTE (MAIN ROAD NAME) | EAST LONGITUDE (°) | NORTH LATITUDE (°) |
|---|---|---|---|
| 102 | ROUTE 1 | 135, 02, 30 | 34, 01, 05 |
| 103 | ROUTE 1 | 135, 02, 20 | 34, 01, 20 |
| 104 | ROUTE 1 | 135, 02, 15 | 34, 01, 40 |
| 202 | ROUTE 2 | 135, 01, 40 | 34, 01, 20 |
| 203 | ROUTE 2 | 135, 01, 50 | 34, 01, 20 |
| 204 | ROUTE 2 | 135, 02, 10 | 34, 01, 20 |

FIG. 7A

AREA NUMBER 5297

| INTERSECTION NUMBER | ATTRIBUTE (MAIN ROAD NAME) | EAST LONGITUDE (°) | NORTH LATITUDE (°) |
|---|---|---|---|
| 130 | ROUTE 1 | 135, 01, 15 | 34, 00, 10 |
| 131 | ROUTE 1 | 135, 01, 15 | 34, 00, 20 |
| 132 | ROUTE 1 | 135, 01, 15 | 34, 00, 30 |
| 133 | ROUTE 1 | 135, 01, 15 | 34, 00, 40 |
| 134 | ROUTE 1 | 135, 01, 15 | 34, 00, 53 |

FIG. 7B

AREA NUMBER 5298

| INTERSECTION NUMBER | ATTRIBUTE (MAIN ROAD NAME) | EAST LONGITUDE (°) | NORTH LATITUDE (°) |
|---|---|---|---|
| 135 | ROUTE 1 | 135, 01, 15 | 34, 01, 05 |
| 136 | ROUTE 1 | 135, 01, 15 | 34, 01, 10 |
| 137 | ROUTE 1 | 135, 01, 15 | 34, 01, 22 |
| 138 | ROUTE 1 | 135, 01, 15 | 34, 01, 38 |

EXPRESSWAY — AREA NUMBER 350

| INTERCHANGE NAME | ATTRIBUTE (EXPRESSWAY NAME) | EAST LONGITUDE (°) | NORTH LATITUDE (°) |
|---|---|---|---|
| A | FIRST EXPRESSWAY | 136, 01, 00 | 34, 05, 00 |
| B | FIRST EXPRESSWAY | 136, 03, 00 | 34, 05, 00 |
| C | FIRST EXPRESSWAY | 136, 05, 00 | 34, 05, 00 |
| D | SECOND EXPRESSWAY | 136, 02, 30 | 34, 06, 00 |
| E | SECOND EXPRESSWAY | 136, 05, 30 | 34, 07, 00 |

STATION

MAIN ROAD

EXPRESSWAY

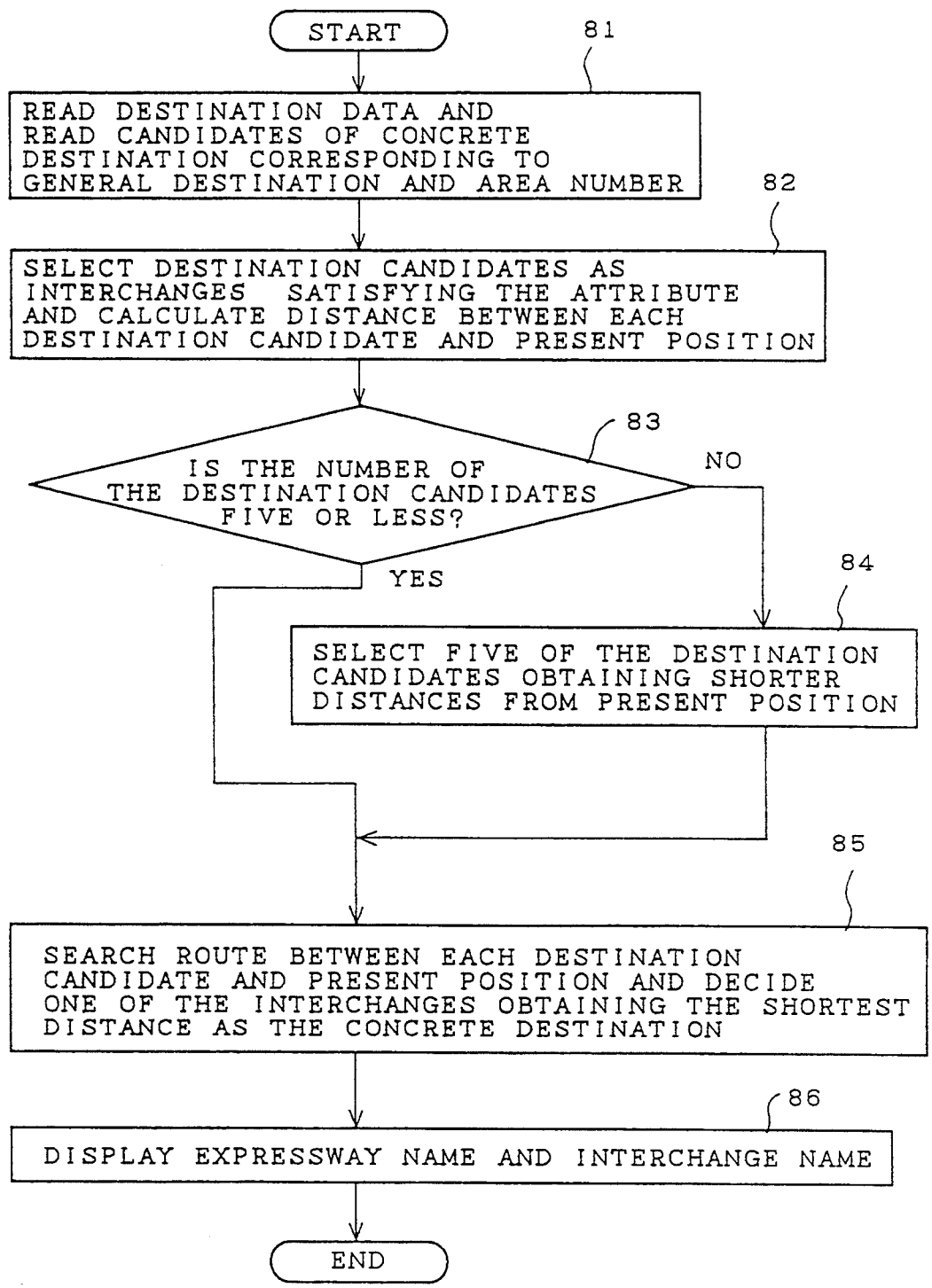

NAVIGATION SYSTEM FOR VEHICLE

BACKGROUND OF THE INVENTION

1. Field of the Invention

The present invention relates to a navigation system for searching a route between a start position and a destination to guide a vehicle to the destination, and more particularly to an improvement in input operation for the destination.

2. Description of the Prior Art

FIG. 1 shows a construction of a conventional navigation system as described in Japanese Patent Laid-open Publication No. 2-166600, for example. Referring to FIG. 1, reference numeral 1 designates input means for inputting a start position, a destination, etc. Reference numeral 2 designates signal processing means composed of computing means 22 and display control means 23. The computing means 22 detects a vehicle position on the basis of an azimuth detection signal and a distance detection signal from vehicle position detecting means 6, and selects a data from a road network database 5a to calculate a shortest distance. The display control means 23 performs control of display.

Reference numeral 5 designates map data storing means, such as a CD-ROM, composed of the road network database 5a and a road map database 5b. The road network database 5a preliminarily stores a plurality of road network data each composed of roads between a start position and a destination area connected together through a trunk road. The road map database 5b preliminarily stores road map data containing coordinate information, which is used in a general navigation system. The vehicle position detecting means 6 detects an azimuth and a distance. Reference numeral 7 designates display means such as a CRT. The display means 7 is controlled by the display control means 23.

In operation, when a start position and a destination are input from the input means 1 such as a ten-key pad, the computing means 22 computes a vehicle position on the basis of an azimuth detection signal and a distance detection signal from the vehicle position detecting means 6, and selects data from the road network database 5a to calculate a shortest distance from the vehicle position to the destination.

The display control means 23 decides a shortest route from the vehicle position to the destination on the basis of data from the road map database 5b, and the display means 7 displays the shortest route decided above. As mentioned above, in the conventional navigation system, when the start position as a single point and the destination as a single point are input, the shortest route to the destination is automatically searched and displayed.

However, even when an operator does not intend to specify the destination as a single point, the single point on the map has to be specified in the system. In most cases, during travelling of the vehicle, it is required to guide a route to a trunk road or indicate any one of plural destinations existing in the periphery of the vehicle present position. In such cases, the operator must search the map, so that the input operation becomes complicated.

SUMMARY OF THE INVENTION

It is accordingly an object of the present invention to solve the above-mentioned problems and to provide a navigation system for a vehicle which can make the input operation easy.

According to the present invention, there is provided a navigation system for a vehicle comprising an input section for inputting a general destination, such as a station or a main road, not specifying any proper points; a destination data memory for storing destination data as information relating to the proper points; an attribute data memory for storing attribute data associating the general destination with the destination data; means for deciding an attribute of the general destination according to the general destination input, a present position of the vehicle, and the attribute data; means for deciding a plurality of candidates of a concrete destination according to the general destination input, the attribute decided, and the destination data; and means for deciding the concrete destination from the candidates decided.

In this invention, a general destination not specifying any proper points is first input, and a plurality of candidates of a concrete destination are then decided according to the general destination input, a present position of the vehicle, an attribute of the general destination, and destination data. Finally, one of the candidates is decided as the concrete destination.

Other objects and features of the invention will be more fully understood from the following detailed description and appended claims when taken with the accompanying drawings.

BRIEF DESCRIPTION OF THE DRAWINGS

FIG. 3 is a schematic illustration of a display screen displaying a menu of various general destinations;

FIG. 4A is a schematic illustration of an example of attribute data;

FIG. 4B is a schematic illustration of another example of the attribute data;

FIG. 5 is a schematic illustration of a further example of the attribute data;

FIG. 6 is a schematic illustration of an example of destination data;

FIGS. 7A, 7B and 7C are schematic illustrations of another example of the destination data;

FIG. 8 is a schematic illustration of a further example of the destination data;

FIG. 17 is a flowchart illustrating a further example of the search processing for the candidates of the concrete destination.

DETAILED DESCRIPTION OF THE PREFERRED EMBODIMENTS

Figure 1:
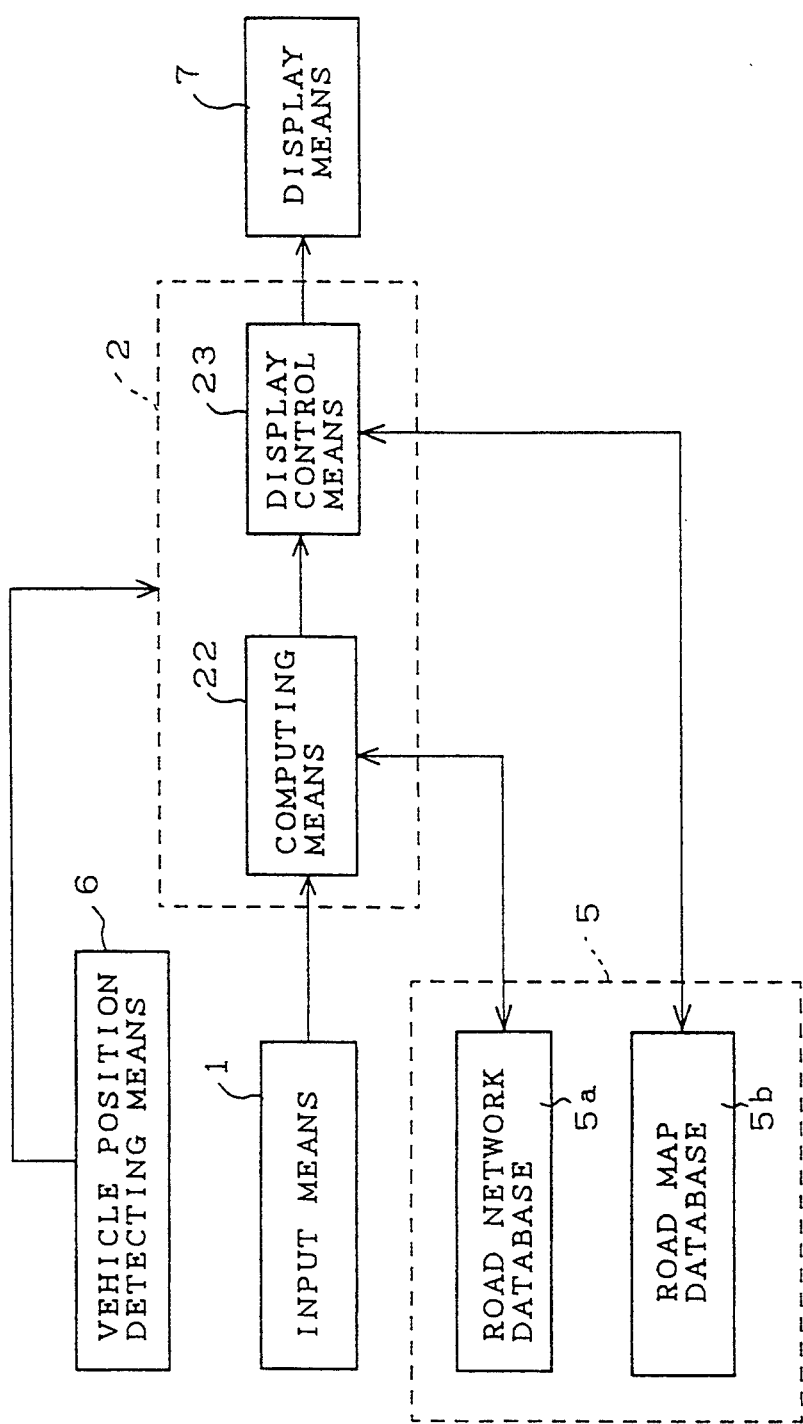
FIG. 1 is a block diagram of a navigation system for a vehicle in the prior art.
Figure 2:
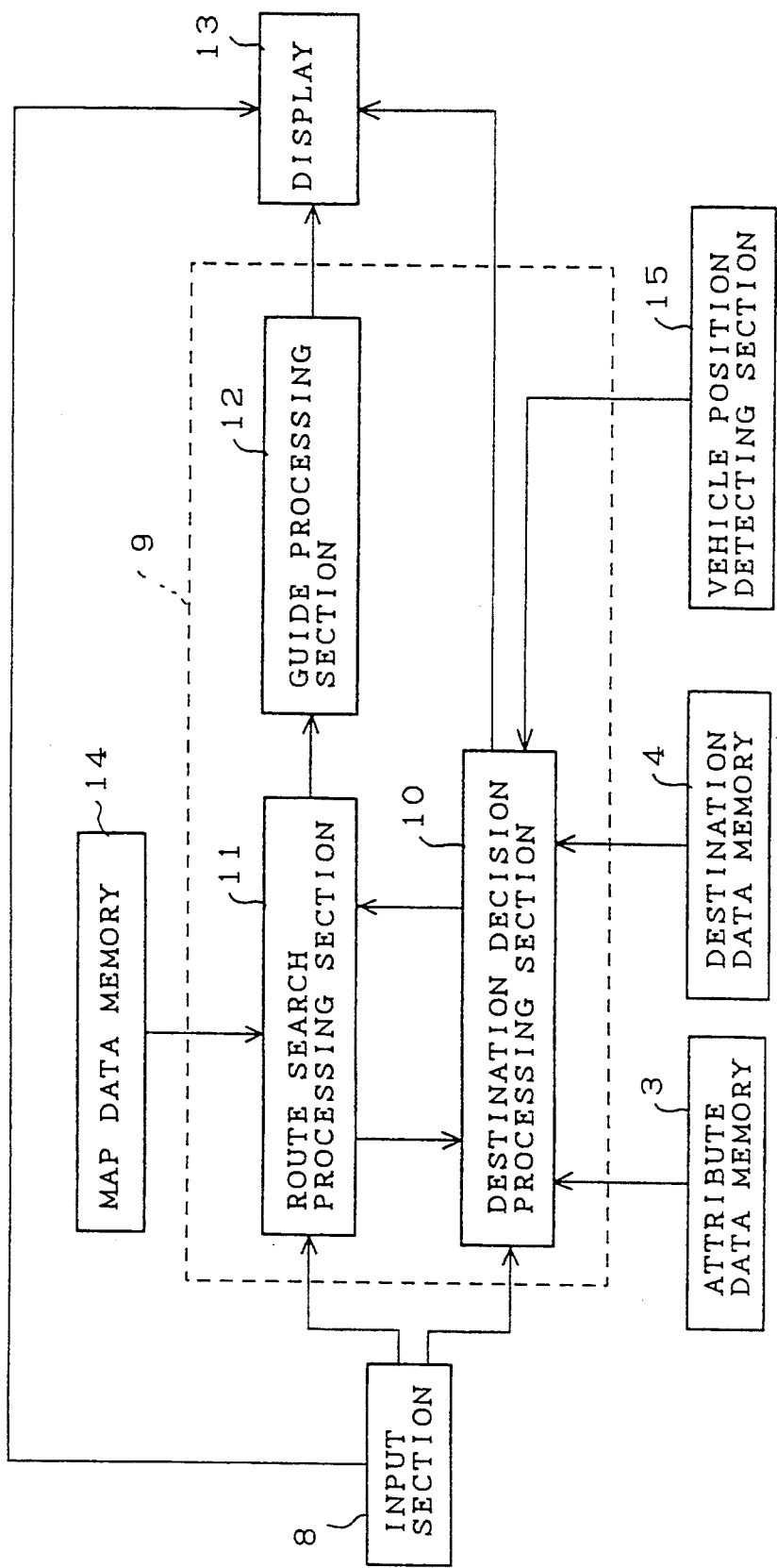
FIG. 2 is a block diagram of a navigation system for a vehicle according to a preferred embodiment of the present invention.

There will now be described a preferred embodiment of the present invention with reference to the drawings. Referring to FIG. 2 which shows a construction of the navigation system according to the present invention, reference numeral 8 designates an input section for inputting a destination, and reference numeral 9 designates a navigation processing section, which is constituted by a destination decision processing section 10, a route search processing section 11 and a guide processing section 12.

The destination decision processing section 10 selects a concrete destination as a proper point on a map according to a general destination input as a general noun, such as a station or a main road, from the input section 8. The route search processing section 11 searches a route between a present position and the concrete destination selected by the destination decision processing section 10, or extracts a route only from the present position to the concrete destination. The guide processing section 12 controls a display 13 to perform route guidance on the display 13.

Reference numeral 3 designates an attribute data memory storing attribute data including a class and attributes corresponding a general destination such as a station or a main road. There are shown examples of the attribute data in FIGS. 4A, 4B and 5. The example shown in FIG. 4A is the attribute data for the case in which the general destination is a station. As the attribute data corresponding to the station, there are stored in order the general destination, class, absolute position (east longitude and north latitude) of each area, attributes in each area, and area number of each area. The example shown in FIG. 4B is the attribute data for the case in which the general destination is a main road. Also in this case, as the attribute data corresponding to the main road, there are stored in order the general destination, class, absolute position (east longitude and north latitude) of each area, attributes in each area, and area number of each area.

The example shown in FIG. 5 is the attribute data for the case in which the general destination is an expressway. Also in this case, as the attribute data corresponding to the expressway, there are shown in order the general destination, class, absolute position (east longitude and north latitude) of each area, attributes in each area, and area number of each area. The class for the main road is defined as a second class; the class for the expressway is defined as a third class; and the class for the station and others is defined as a first class. The attributes for the station represent names of railroad lines; the attributes for the main road represent names of national roads; and the attributes for the expressway represent names of expressways. Every area is defined as a square having each side of a given distance as obtained by sectioning a map referred to using the area number.

Reference numeral 4 designates a destination data memory storing destination data. There are shown examples of the destination data in FIGS. 6 to 8. The example shown in FIG. 6 is the destination data for the case in which the general destination is a station. As the destination data corresponding to the station, there are stored in order proper names (names of stations), attributes (names of railroad lines), and absolute positions (east longitude and north latitude). The examples shown in FIGS. 7A to 7C are the destination data for the case in which the general destination is a main road. Also in this case, as the destination data corresponding to the main road, there are stored in order proper names (numbers of intersections), attributes (names of main roads), and absolute positions (east longitude and north latitude). The example shown in FIG. 8 is the destination data for the case in which the general destination is an expressway. Also in this case, as the destination data corresponding to the expressway, there are stored in order proper names (names of interchanges), attributes (names of expressways), and absolute positions (east longitude and north latitude).

Figure 9A:
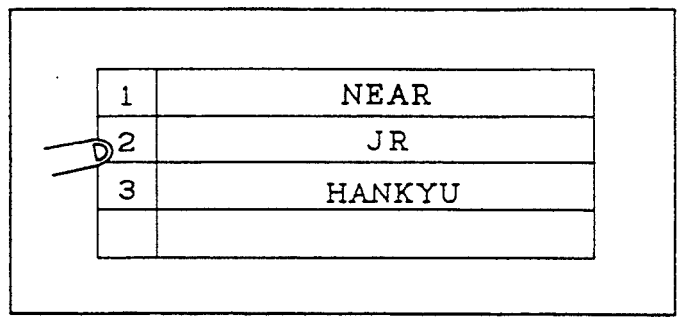
FIG. 9A is a schematic illustration of an example of a display screen displaying attributes.
Figure 9B:
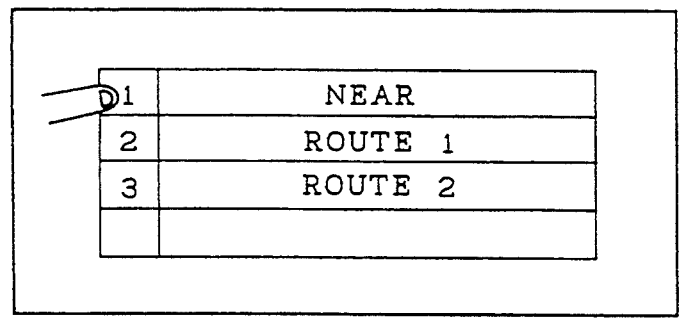
FIG. 9B is a schematic illustration of another example of the display screen.
Figure 9C:
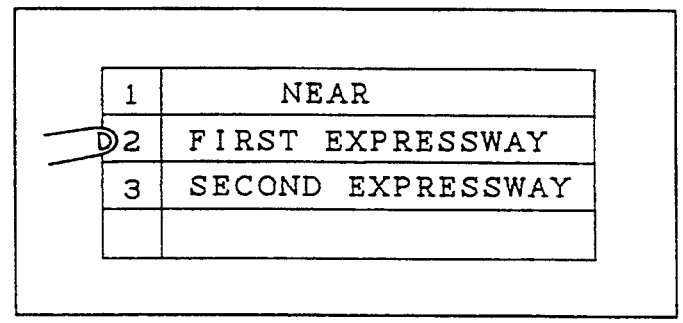
FIG. 9C is a schematic illustration of a further example of the display screen.
Figure 10:
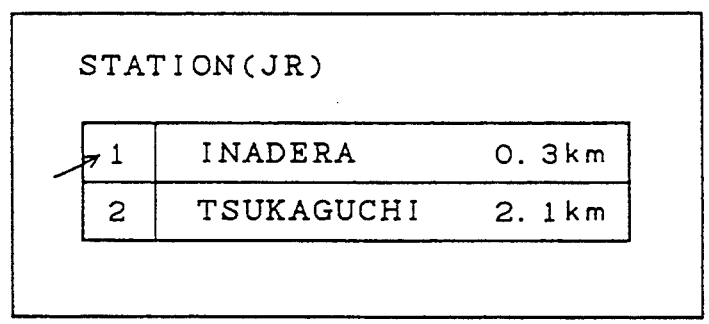
FIG. 10 is a schematic illustration of an example of a display screen displaying candidates of a concrete destination.

Reference numeral 14 designates a map data memory storing digitized map data, and reference numeral 15 designates a vehicle position detecting section for detecting a present absolute position (east longitude and north latitude) of a vehicle. The present absolute position of the vehicle may be detected by utilizing a GPS satellite as described in Japanese Patent Laid-open Publication No. 63-171377 or by using a distance sensor and an azimuth sensor with reference to map data as described in Japanese Patent Laid-open Publication No. 63-148115, for example. The display 13 displays a route obtained as the result of route search, a plurality of general destinations in the form of a menu, attributes corresponding to a general destination input, and candidates for a concrete destination. FIG. 3 shows an example of a display screen displaying the general destinations in the form of a menu; FIGS. 9A to 9C show examples of display screens displaying the attributes corresponding to a station, main road and expressway, respectively; and FIG. 10 shows an example of a display screen displaying the candidates for the concrete destination.

Figure 11:
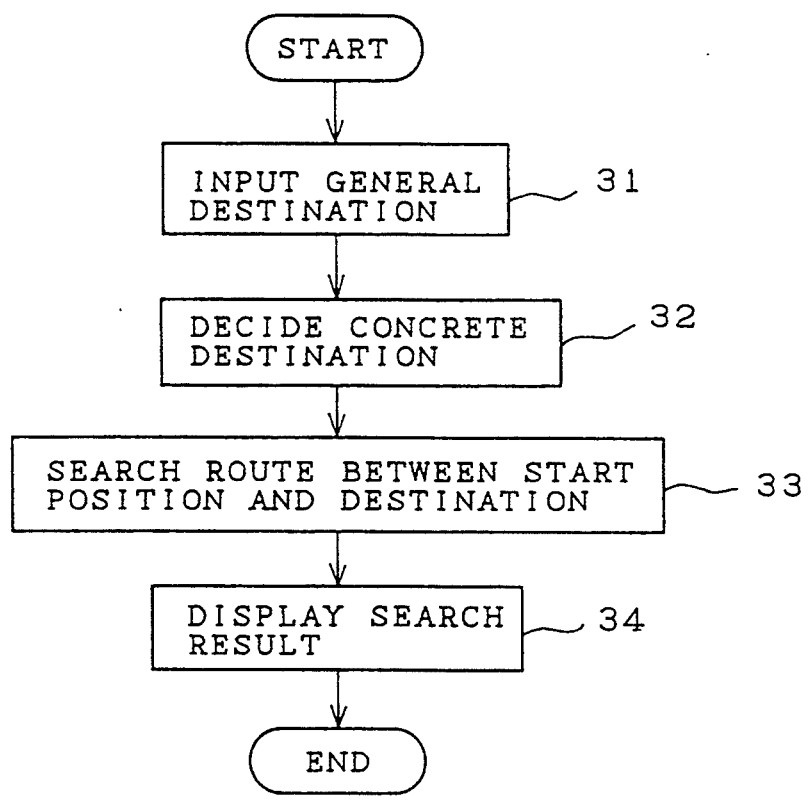
FIG. 11 is a flowchart illustrating the whole operation of the navigation system according to the preferred embodiment of the present invention.

Now, the operation will be described with reference to the flowchart shown in FIG. 11. In step 31, the input section 8 controls the display 13 to display a plurality of candidates (general nouns) of a general destination in the form of a menu as shown in FIG. 3. In this condition, when a desired one of the general destination candidates, e.g., "STATION" is depressed by an operator with a finger or the like, the desired general destination is selected. As another method of selecting a desired general destination, the operator may speak the desired general destination, and the operator's voice may be input by voice recognition means. Concretely, this method may be easily realized by using a voice input device as described in Japanese Patent Laid-open Publication No. 63-261108, for example.

Figure 12:
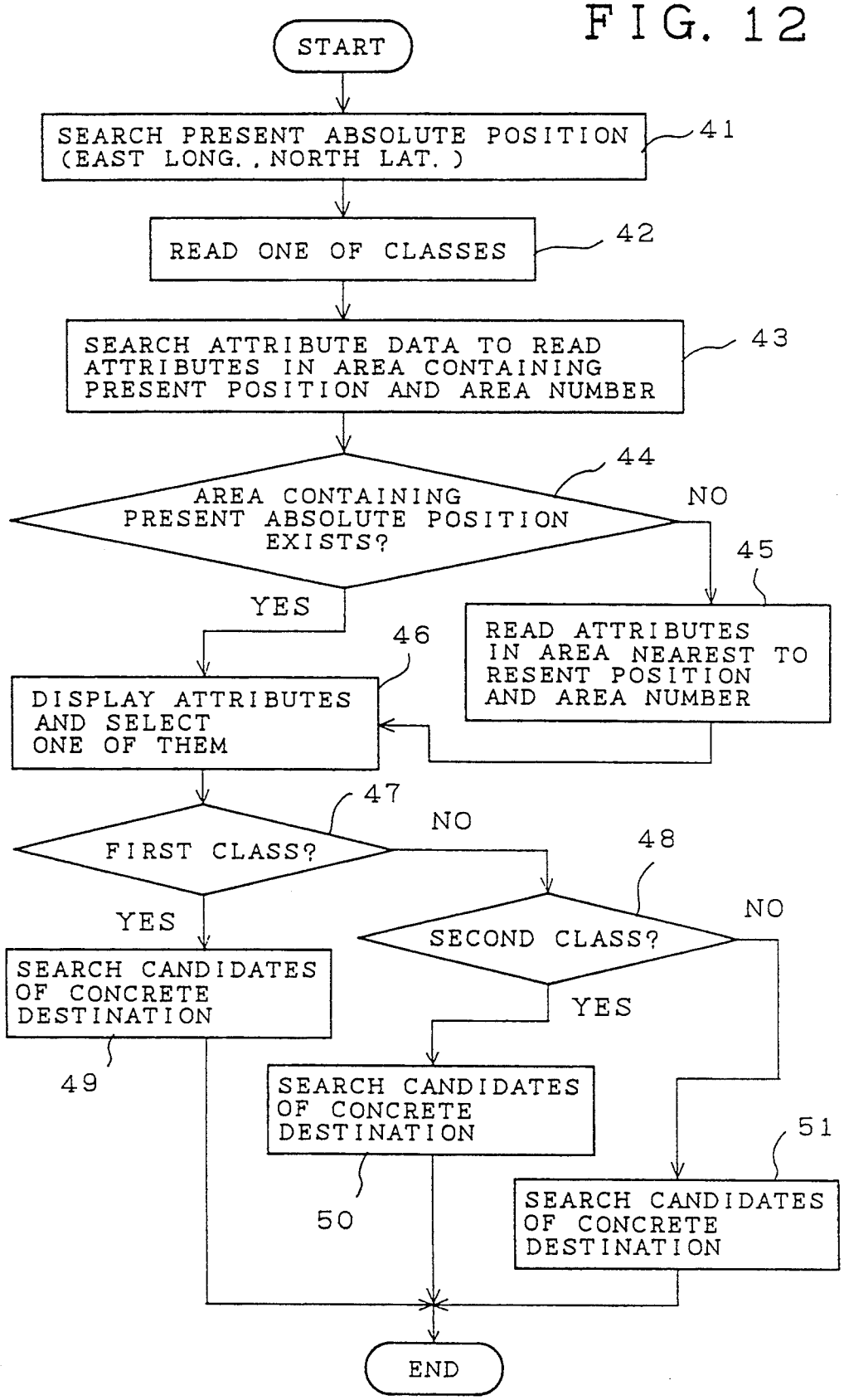
FIG. 12 is a flowchart illustrating destination decision processing.

Then in step 32, destination decision processing is carried out to decide a concrete destination according to the general destination input. That is, in this case, a specific station is decided as a railroad name and a station name. This processing will be described in more detail with reference to the flowchart shown in FIG. 12. In step 41, the destination decision processing section 10 reads a present absolute position (assumed to be represented as 136 degrees 02 minutes 28 seconds of east longitude and 33 degrees 03 minutes 30 seconds of north latitude, for example) of the vehicle from the vehicle position detecting section 15. In step 42, the destination decision processing section 10 reads the class for "STATION" from the attribute data memory 3. That is, according to the data shown in FIG. 4A, the first class is read.

In step 43, the destination decision processing section 10 reads the attributes in the area containing the present absolute position and the area number of this area from the attribute data memory 3. In FIG. 4A, it is understood that the present absolute position assumed previously is contained in the area ranging from 136 degrees 00 minutes 00 seconds to 136 degrees 03 minutes 00 seconds of east longitude and ranging from 33 degrees 02 minutes 00 seconds to 33 degrees 04 minutes 00 seconds of north latitude. Accordingly, the area number of 1500 and the attributes of "NEAR", "JR" and "HANKYU" are read out. In step 44, it is determined whether or not the area containing the present absolute position exists. If this area exists as mentioned above, the destination decision processing section 10 controls the display 13 to display the attributes as shown in FIG. 9A in step 46. In this condition, when a desired one of the attributes, e.g., "JR" is depressed by the operator, the attribute of "JR" for the general destination of "STATION" is selected.

Figure 13:
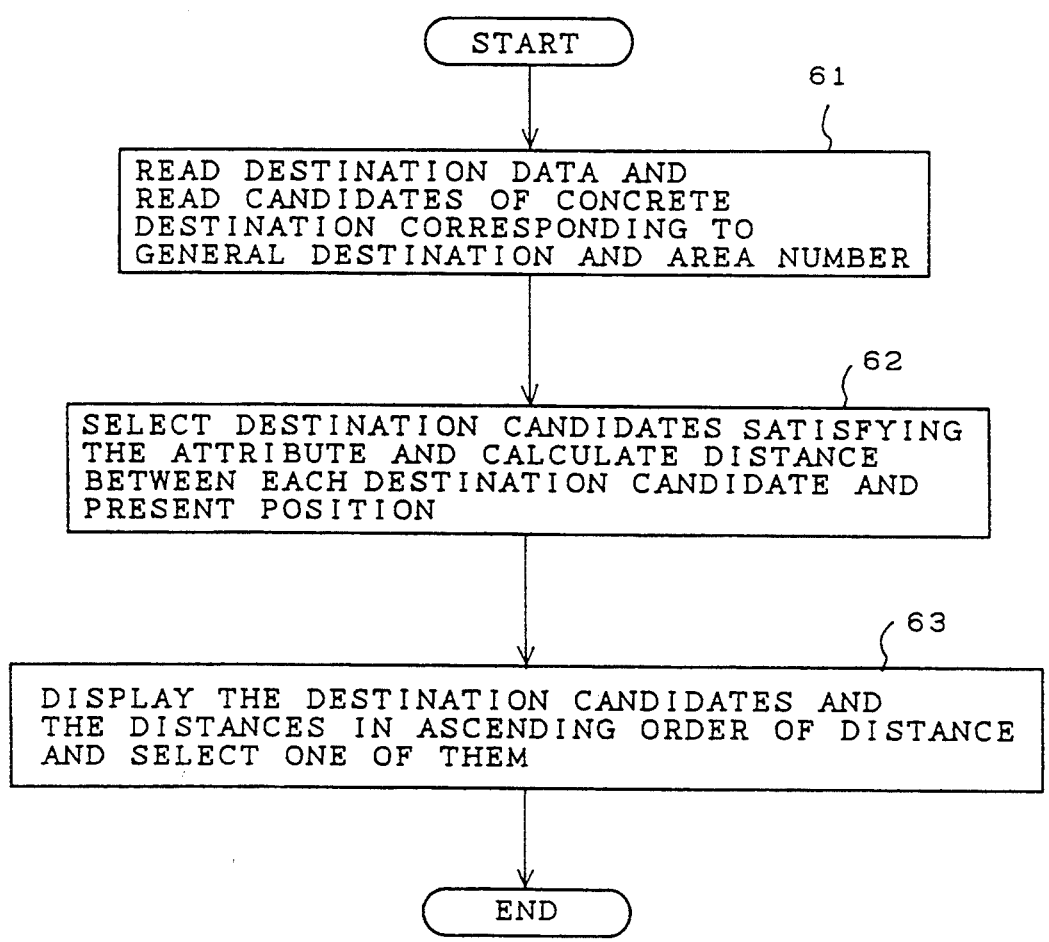
FIG. 13 is a flowchart illustrating an example of search processing for the candidates of the concrete destination.

If it is determined in step 44 that the area containing the present absolute position does not exist, the attributes in an area nearest to the present absolute position and the area number of this nearest area are read out in step 45. In step 47, it is determined whether or not the general destination of "STATION" is of the first class. If the general destination is of the first class, the destination decision processing section 10 performs search processing for candidates of a concrete destination in step 49. This processing will be described in more detail with reference to the flowchart shown in FIG. 13.

In step 61, the destination decision processing section 10 reads the candidates for the concrete destination corresponding to the general destination and the area number from the destination data memory 4. As the general destination is "STATION" and the area number is 1500 in this case, the candidates of the concrete destination to be read are JR "INADERA", JR "TSUKAGUCHI", HANKYU "TSUKAGUCHI", and HANKYU "MUKONOSO" as shown in FIG. 6. In step 62, of these candidates, some satisfying the attribute of "JR" are selected. That is, JR "INADERA" and JR "TSUKAGUCHI" are selected. Furthermore, a rectilinear distance from the present absolute position of the vehicle to each candidate thus selected is calculated. This rectilinear distance may be calculated from the absolute position (east longitude and north latitude) of each candidate stored as the destination data (see FIG. 6) and the present absolute position (east longitude and north latitude) of the vehicle.

More specifically, a difference of 30 seconds in latitude corresponds to about 1 km, and a difference of 45 seconds in longitude corresponds to about 1 km. Therefore, in calculating the rectilinear distance from the present absolute position to the station of JR "TSUKAGUCHI", since a difference in latitude is 1 minute, and a difference in longitude is 28 seconds, a difference in vertical distance is calculated as 2 km, and a difference in horizontal distance is calculated as 0.64 km. Accordingly, the rectilinear distance between the present absolute position and the station of JR "TSUKAGUCHI" is calculated as about 2.1 km. Similarly, the rectilinear distance from the present absolute position and the station of JR "INADERA" is also calculated. Then, in step 63, the destination decision processing section 10 controls the display 13 to display the candidates of the concrete destination and the rectilinear distances between the present absolute position and the candidates in the ascending order of the distance as shown in FIG. 10. In this condition, when a desired one of the candidates, e.g., "INADERA" is depressed by the operator as shown by an arrow in FIG. 10, the concrete destination of JR "INADERA" is decided. Then, the destination decision processing is ended. Thus, a single point on the map decided by the above destination decision processing is decided as the concrete or specific destination. In the next step, the destination decision processing section 10 inputs the selected destination into the route search processing section 11.

In step 33, the route search processing section 11 reads the map data from the map data memory 14 and searches a route to the decided destination by a suitable method as described in Japanese Patent Laid-open Publication No. 62-133600, for example. That is, distances from an intersection near the present absolute position to other intersections on the way to the destination are calculated and stored as searching the destination from the near intersection to the far intersection. Then, the starting intersection is detected, and the intersections taking the shortest distance are sequentially extracted on the return way from the destination to the starting intersection. In this manner, the route from the starting intersection to the destination is searched.

In step 34, the route search processing section 11 inputs the result of route search into the guide processing section 12. Then, the guide processing section 12 controls the display 13 to display the searched route in superposition with the present absolute position of the vehicle or display a right or left turn indication before the intersection where the vehicle must be turned right or left during travelling, thus guiding the vehicle on the route.

While the destination candidates displayed on the display 13 are listed in the ascending order of the rectilinear distance between the present absolute position and each destination candidate as shown in FIG. 10 according to the above preferred embodiment, the destination candidates may be listed in the optimum order of a travel distance, a travel time, etc. as described in Japanese Patent Laid-open Publication No. 62-133600, for example. That is, after the decision of the destination candidates, a route between each destination candidate and the starting point may be actually searched, and a travel distance or a travel time may be calculated for each route searched. Further, while the right or left turn indication is displayed on the display 13 in the above preferred embodiment, it may be carried out by an audio output unit as described in Japanese Patent Laid-open Publication No. 62-267900, for example.

Further, while the item of "STATION" is input as the general destination in the above preferred embodiment, the operator may input and select a desired one of plural general destination candidates displayed in the form of a menu, such as hospital, gas station, dealer, restaurant, parking lot, department store, supermarket, convenience store, etc. as shown in FIG. 3. Further, a major item such as a station may be preliminarily set as a default item, and a destination term such as "NEAR JR" may be input to follow the processing shown in FIG. 13. Thus, not only a general noun but also a destination term containing a proper noun and not specifying a concrete point may be input and selected.

Now, there will be described a case where the item of "MAIN ROAD" is input as the general destination. The operation in this case will be described with reference to the flowchart shown in FIG. 11. In step 31, the input section 8 controls the display 13 to display a plurality of candidates of a general destination in the form of a menu as shown in FIG. 3. When the item of "MAIN ROAD" in the menu is depressed by the operator with a finger or the like, it is selected as the general destination. Then, in step 32, the destination decision processing section 10 performs destination decision processing, so as to specify a concrete main road and an intersection lying thereon as the concrete destination. This processing will be described in more detail with reference to the flowchart shown in FIG. 12.

Figure 14:
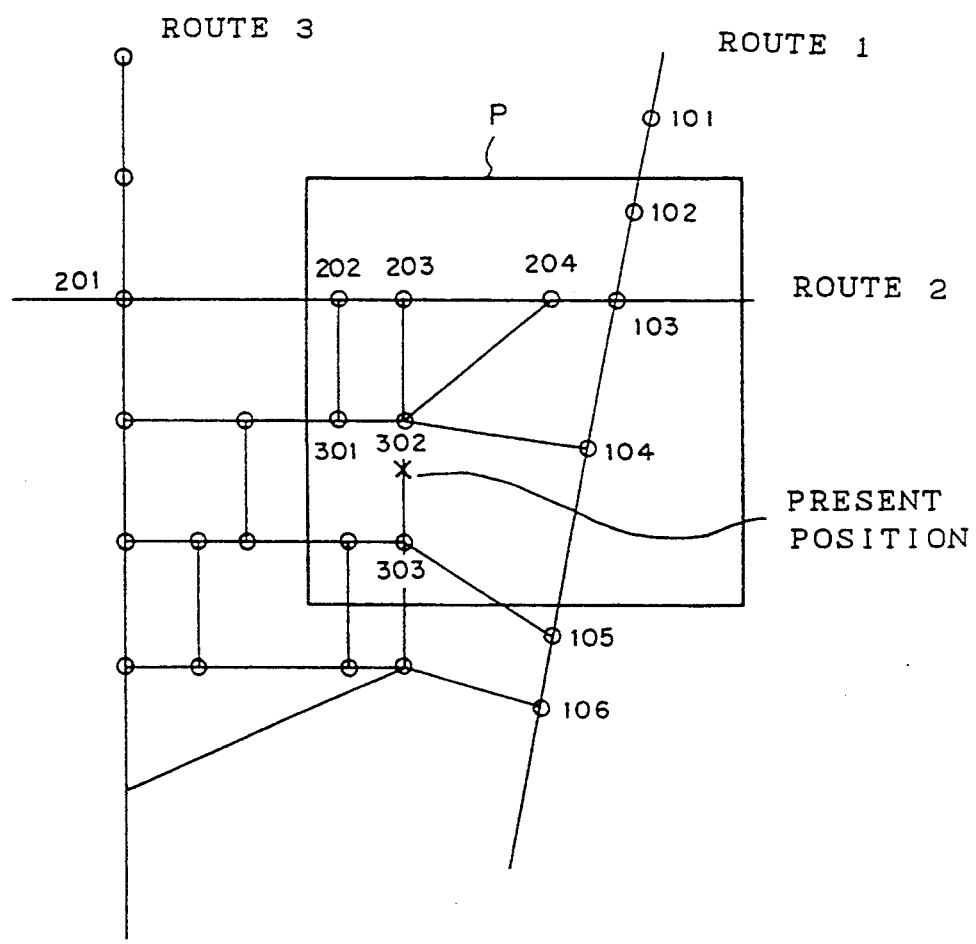
FIG. 14 is a diagrammatic view of an example of road data in map data.

First in step 41, a present absolute position of the vehicle is read from the vehicle position detecting section 15. In step 42, the class for "MAIN ROAD" is read from the attribute data memory 3. That is, according to the data shown in FIG. 4B, the second class is read. In step 43, the attributes in the area containing the present absolute position and the area number of this area is read from the attribute data memory 3. FIG. 14 shows an exemplary road data in the map data, wherein a plurality of marks ○ represent intersections, and a plurality of numbers near the marks ○ represent a series of intersection numbers given for every road name.

Assuming that the present absolute position of the vehicle is represented as 135 degrees 01 minute 50 seconds of east longitude and 34 degrees 01 minute 43 seconds of north latitude, it is understood from FIG. 4B that this present absolute position is contained in the area ranging from 135 degrees 01 minute 30 seconds to 135 degrees 03 minutes 00 seconds of east longitude and ranging from 34 degrees 01 minute 00 seconds to 34 degrees 02 minutes 00 seconds of north latitude. This area is assumed as a square area depicted by P in FIG. 14. Accordingly, the area number of 5299 and the attributes of "NEAR", "ROUTE 1" and "ROUTE 2" are read out. Then, the program proceeds through step 44 to step 46, in which the attributes as shown in FIG. 9B are displayed on the display 13. In this condition, when a desired one of the attributes, e.g., "NEAR" is depressed by the operator, the attribute of "NEAR" for the general destination of "MAIN ROAD" is decided.

Figure 15:
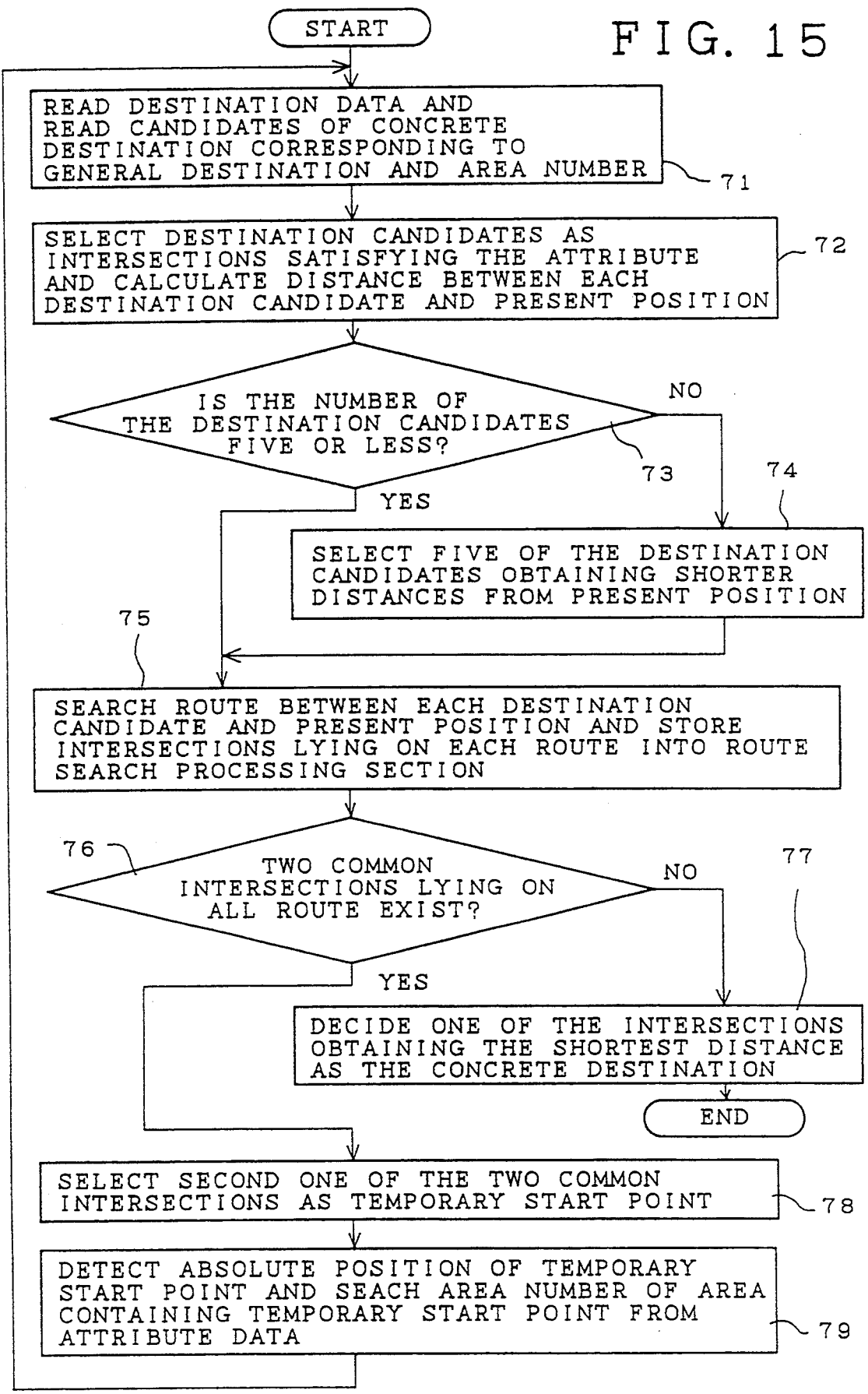
FIG. 15 is a flowchart illustrating another example of the search processing for the candidates of the concrete destination.

Then, the program proceeds through steps 47 and 48 to step 50 because the general destination of "MAIN ROAD" is of the second class. In step 50, search processing for candidates of a concrete destination is performed. This processing will be described in more detail with reference to the flowchart shown in FIG. 15. In step 71, the candidates of the concrete destination corresponding to the general destination and the area number are read from the destination data memory 4. In step 72, as the attribute is "NEAR", all the intersections contained in the area corresponding to the area number of 5299 shown in FIG. 7A are selected as the candidates of the concrete destination, and a rectilinear distance between each candidate and the present absolute position is calculated.

As the six candidates of the concrete destination exist according to the data shown in FIG. 7A, the program proceeds from step 73 to step 74, in which five of the six candidates taking the shorter rectilinear distances are selected. That is, the intersection numbers 103 and 104 of the ROUTE 1 and the intersection numbers 202, 203 and 204 of the ROUTE 2 are the five candidates of the concrete destination. In step 75, the route search processing section 11 reads the map data from the map data memory 14 and searches routes from the present absolute position to the five destination candidates with reference to the map data by a suitable method as described in Japanese Patent Laid-open Publication No. 62-133600, for example. That is, distances from an intersection near the present absolute position to other intersections on the way to each destination candidate are calculated and stored as searching the destination candidate from the near intersection to the far intersection. Then, the starting intersection is detected, and the intersections taking the shortest distance are sequentially extracted on the return way from each destination candidate to the starting intersection. In this manner, the route from the starting intersection to each destination candidate is searched.

More specifically, referring to FIG. 14, the route search processing section 11 stores in order the intersection numbers 302 and 204 lying on the route leading to the candidate intersection number 103, the intersection number 302 lying on the route leading to the candidate intersection number 104, the intersection numbers 302 and 301 lying on the route leading to the candidate intersection number 202, the intersection number 302 lying on the route leading to the candidate intersection number 203, and the intersection numbers 302 and 203 lying on the route leading to the candidate intersection number 204. Further, the absolute positions (east longitude and north latitude) of these intersection numbers are also stored into the route search processing section 11.

Then in step 76, the destination decision processing section 10 determines whether or not there exist two common intersection numbers lying on all the routes stored into the route search processing section 11. As there exists the single common intersection number 302 in this case, the program proceeds to step 77, in which the destination candidate taking the shortest travel distance (i.e., the candidate intersection number 203 in this case) is decided as the concrete destination. Then, the destination decision processing is ended.

Referring back to FIG. 11, in step 33, the route search processing section 11 extracts only the route leading to the destination decided above from the routes leading to the destination candidates previously stored therein. Then in step 34, the guide processing section 12 controls the display 13 to display the route extracted above and guide the vehicle on the route displayed.

Figure 16:
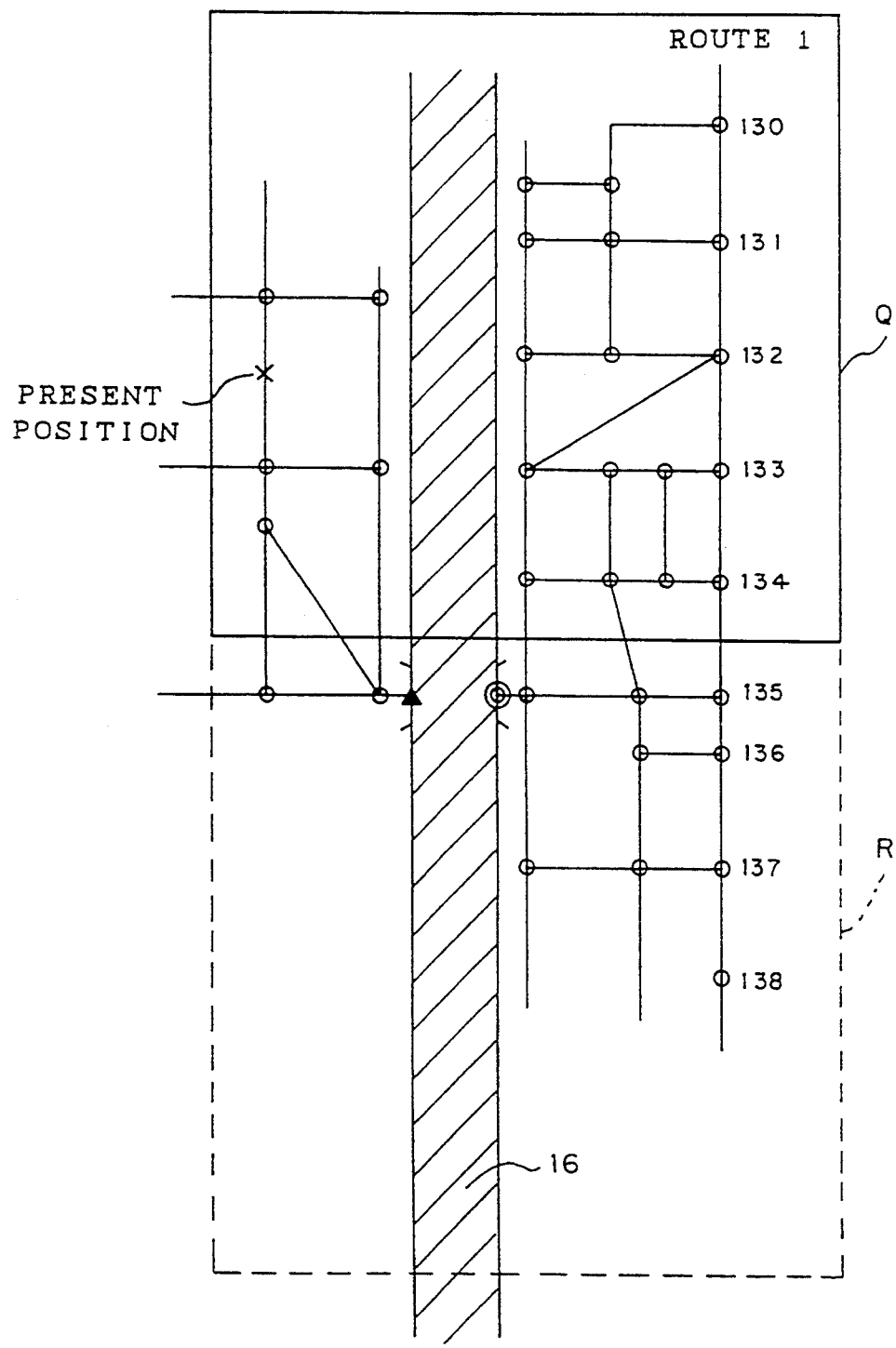
FIG. 16 is a diagrammatic view of another example of the road data in the map data.

Now, there will be described another case where the item of "MAIN ROAD" is input as the general destination, and the concrete destination to be specified is located beyond a river or the like. FIG. 16 shows an exemplary road data in the map data as similar to FIG. 14, in which there exists a river 16. The operation in this case will be described with reference to the flowchart shown in FIG. 11. In step 31, the input section 8 controls the display 13 to display a plurality of candidates of a general destination in the form of a menu as shown in FIG. 3. When the item of "MAIN ROAD" in the menu is depressed by the operator, it is selected as the general destination. Then in step 32, the destination decision processing section 10 performs destination decision processing, so as to specify a concrete main road and an intersection lying thereon as the concrete destination. This processing will be described in more detail with reference to the flowchart shown in FIG. 12.

In step 41, the destination decision processing section 10 reads out a present absolute position of the vehicle from the vehicle position detecting section 15. In step 42, the class for "MAIN ROAD" is read from the attribute data memory 3. That is, according to the data shown in FIG. 4B, the second class is read. In step 43, the attributes in the area containing the present absolute position and the area number of this area are read from the attribute data memory 3. In the case of the road map shown in FIG. 16, assuming that the present absolute position of the vehicle is represented as 135 degrees 00 minutes 10 seconds of east longitude and 34 degrees 00 minutes 35 seconds of north latitude, it is understood from FIG. 4B that this present absolute position is contained in the area ranging from 135 degrees 00 minutes 00 seconds to 135 degrees 01 minute 30 seconds of east longitude and ranging from 34 degrees 00 minutes 00 seconds to 34 degrees 01 minute 00 seconds of north latitude. This area is assumed as a square area depicted by Q in FIG. 16. Accordingly, the area number of 5297 and the attributes of "NEAR" and "ROUTE 1" are read out.

Then, the program proceeds through step 44 to step 46, in which the attributes of "NEAR" and "ROUTE 1" are displayed on the display 13. In this condition, when a desired one of the attributes, e.g., "ROUTE 1" is selected, the program proceeds through steps 47 and 48 to step 50 because the general destination of "MAIN ROAD" is of the second class. In step 50, search processing for candidates of a concrete destination is performed. This processing will be described in more detail with reference to the flowchart shown in FIG. 15. In step 71, the candidates for the concrete destination corresponding to the general destination and the area number are read from the destination data memory 4. In step 72, as the attribute is "ROUTE 1", the intersections of "ROUTE 1" in the area corresponding to the area number of 5297 shown in FIG. 7B are selected as the candidates of the concrete destination, and a rectilinear distance between each candidate and the present absolute position is calculated.

As the five intersection numbers 130, 131, 132, 133 and 134 are selected as the candidates of the concrete destination according to the data shown in FIG. 7B, the program proceeds through step 73 to step 75. In step 75, the route search processing section 11 reads the map data from the map data memory 14 and searches routes from the present absolute position to the five destination candidates with reference to the map data by a suitable method as described in Japanese Patent Laid-open Publication No. 62-133600, for example. That is, distances from an intersection near the present absolute position to other intersections on the way to each destination candidate are calculated and stored as searching the destination candidate from the near intersection to the far intersection. Then, the starting intersection is detected, and the intersections taking the shortest distance are sequentially extracted on the return way from each destination candidate to the starting intersection. In this manner, the route from the starting intersection to each destination candidate is searched. Furthermore, the route search processing section 11 stores the intersection numbers lying on the route leading to each destination candidate, and also stores the absolute positions (east longitude and north latitude) of these intersection numbers.

In step 76, it is determined whether or not there exist two common intersection numbers lying on all the routes stored into the route search processing section 11. In this case, since the intersection beside the mark ▲ and the intersection beside the mark ⊙ located at the opposite ends of a bridge crossing the river 16 are commonly lying on all the routes, the program proceeds to step 78, in which the second one of the common intersection numbers (i.e., the intersection beside the mark ⊙) is decided as a temporary starting point. Then in step 79, the absolute position of this temporary starting point (assumed to be represented as 135 degrees 00 minutes 40 seconds of east longitude and 34 degrees 01 minute 10 seconds of north latitude in this case) is read from the route search processing section 11. Then, the area number 5298 of the area containing the temporary starting point is read from the attribute data shown in FIG. 4B. This area is assumed as a square area depicted by R in FIG. 16. Then, the program returns to step 71 to follow the operation similar to the above.

Finally, there will be described a case where the item of "EXPRESSWAY" is input as the general destination. The operation in this case will be described with reference to the flowchart shown in FIG. 11. First in step 31, the input section 8 controls the display 13 to display a plurality of candidates of a general destination in the form of a menu as shown in FIG. 3. When the item of "EXPRESSWAY" in the menu is selected by the operator, the destination decision processing section 10 performs destination decision processing, so as to decide a concrete interchange (expressway name and interchange name) as the concrete destination. This processing will be described in more detail with reference to the flowchart shown in FIG. 12.

In step 41, a present absolute position of the vehicle is read from the vehicle position detecting section 15. In this case, the present absolute position of the vehicle is assumed to be represented as 136 degrees 01 minute 00 seconds of east longitude and 34 degrees 06 minutes 00 seconds of north latitude. In step 42, the class for "EXPRESSWAY" is read from the attribute data memory 3. That is, according to the attribute data shown in FIG. 5, the third class is read. In step 43, the attributes in the area containing the present absolute position and the area number of this area are read from the attribute data shown in FIG. 5. That is, the area number of 350 and the attributes of "NEAR", "FIRST EXPRESSWAY" and "SECOND EXPRESSWAY" are read out.

Then in step 46, the attributes of "NEAR", "FIRST EXPRESSWAY" and "SECOND EXPRESSWAY" are displayed on the display 13 as shown in FIG. 9C. In this condition, when a desired one of the attributes, e.g., "FIRST EXPRESSWAY" is depressed by the operator, the attribute of "FIRST EXPRESSWAY" for the general destination of "EXPRESSWAY" is decided. Then, the program proceeds through steps 47 and 48 to step 51 because the general destination of "EXPRESSWAY" is of the third class. In step 51, search processing for candidates of a concrete destination is performed. This processing will be described in more detail with reference to the flowchart shown in FIG. 17. In step 81, the candidates of the concrete destination corresponding to the general destination and the area number are read from the destination data memory 4. That is, as shown in FIG. 8, the interchanges A, B and C of "FIRST EXPRESSWAY" and the interchanges D and E of "SECOND EXPRESSWAY" in the area corresponding to the area number of 350 are read. Then in step 82, as the attribute is "FIRST EXPRESSWAY", the interchanges A, B and C are selected as the candidates of the concrete destination, and a rectilinear distance between each candidate and the present absolute position is calculated.

In step 85, the route search processing section 11 reads the map data from the map data memory 14 and searches routes from the present absolute position to the three destination candidates with reference to the map data by a suitable method. For example, distances from an intersection near the present absolute position to other intersections on the way to each destination candidate are calculated and stored as searching the destination candidate from the near intersection to the far intersection. Then, the starting intersection is detected, and the intersections taking the shortest distance are sequentially extracted on the return way from each destination candidate to the starting intersection. In this manner, the route from the starting intersection to each destination candidate is searched. Concretely, the routes from the present absolute position to the interchanges A, B and C are searched, and the searched routes are stored into the route search processing section 11.

Further, the shortest one of the routes leading to the interchanges A, B and C is decided as the concrete destination. In step 86, the name of the decided interchange and the name of the expressway are displayed. Then, the destination decision processing is ended. Referring back to FIG. 11, in step 33, the route search processing section 11 extracts the route leading to the concrete destination decided above. In step 34, the guide processing section 12 controls the display 13 to display the route extracted above and guide the vehicle on the route displayed.

As described above, according to the present invention, a general destination not specifying any proper points is first input, and a concrete destination is then decided according to the general destination input. Accordingly, input operation can be made easy, and the operator need not carry out any complex input operation.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A navigation system for a vehicle, comprising:
   an input section for inputting a general destination from a plurality of general destination candidates describing general types of destinations;
   a map data memory for storing map data;
   a vehicle position detecting section for detecting a present position of said vehicle;
   a destination data memory for storing destination data consisting of information relating to said types of destinations;
   an attribute data memory for storing attribute data which associates said general destination with said destination data;
   means for selecting an attribute of said general destination according to said general destination input, said present position of said vehicle, and said attribute data;
   means for selecting a plurality of candidates for a specific destination according to said general destination input, said selected attribute, and said destination data;
   means for selecting said specific destination from said selected candidates;
   route searching means for searching a route from said present position of said vehicle to said selected specific destination with reference to said map data;
   output means for outputting said route searched; and
   wherein said means for selecting said attribute of said general destination searches a plurality of candidates of said attribute of said general destination input by said input section in an area containing said present position of said vehicle from said attribute data, and selects one of said candidates of said attribute corresponding to input from an operator, as said attribute of said general destination, and wherein said means for selecting said specific destination decides one of said candidates which obtains a shortest one of said routes searched as said specific destination.

2. The navigation system as defined in claim 1, wherein said means for selecting said candidates of said specific destination searches a plurality of destination candidates corresponding to said general destination input and said area containing said present position of said vehicle from said destination data memory, and selects some of said destination candidates corresponding to said attribute selected by said means for selecting said attribute of said general destination, as said candidates for said specific destination.

3. The navigation system as defined in claim 2, wherein said means for selecting said specific destination calculates distances from said present position of said vehicle to said candidates of said specific destination selected by said means for selecting said candidates of said specific destination, displays said candidates of said specific destination in ascending order of said distances on a display, and selects one of said candidates of said specific destination corresponding to said input from said operator.

4. A navigation system for a vehicle, comprising:
   an input section for inputting a general destination not specifying any specific points from a plurality of general destination candidates;
   a map data memory for storing map data;
   a vehicle position detecting section for detecting a present position of said vehicle;
   a destination data memory for storing destination data as information relating to said specific points;
   an attribute data memory for storing attribute data associating said general destination with said destination data;
   means for selecting an attribute of said general destination according to said general destination input, said present position of said vehicle, and said attribute data;
   means for selecting a plurality of candidates for a specific destination according to said general destination input, said selected attribute, and said destination data;
   route searching means for searching a plurality of routes from said present position of said vehicle to said selected candidates with reference to said map data;

means for selecting said specific destination from said selected candidates;

output means for outputting one of said routes searched which leads to said selected specific destination; and wherein said means for selecting said attribute of said general destination searches a plurality of candidates of said attribute of said general destination input by said input section in an area containing said present position of said vehicle from said attribute data, and selects one of said candidates of said attribute corresponding to input from an operator, as said attribute of said general destination, and wherein said means for selecting said specific destination decides one of said candidates which obtains a shortest one of said routes searched as said specific destination.

5. The navigation system as defined in claim 4, wherein said route searching means sets a new start position at a second one of two common intersections lying on all of said routes searched, and searches a plurality of routes from said new start position to said candidates.

* * * * *